United States Patent [19]

Shimizu et al.

[11] Patent Number: 5,059,773
[45] Date of Patent: Oct. 22, 1991

[54] BAR CODE READER SIGNAL PROCESSING METHOD AND DEVICE

[75] Inventors: Masaharu Shimizu; Tatsuyuki Usami; Yoshihiro Saito; Nobuhiro Nakamura, all of Tokyo, Japan

[73] Assignee: The Japan Steel Works, Ltd., Tokyo, Japan

[21] Appl. No.: 436,999

[22] Filed: Nov. 15, 1989

[30] Foreign Application Priority Data

Nov. 16, 1988 [JP] Japan .................................. 63-287841
Nov. 16, 1988 [JP] Japan .................................. 63-287842

[51] Int. Cl.$^5$ ............................................ G06K 7/00
[52] U.S. Cl. .................................... 235/436; 235/437; 235/463
[58] Field of Search ................ 235/436, 437, 462, 463, 235/466

[56] References Cited

U.S. PATENT DOCUMENTS

4,746,789 5/1988 Gieles et al. ...................... 235/463

Primary Examiner—David Trafton
Attorney, Agent, or Firm—Sughrue, Mion, Zinn, Macpeak & Seas

[57] ABSTRACT

A method of processing a signal in a bar code reader in which an optical signal provided by scanning a bar code is subjected to photo-electric conversion to provide an analog electrical signal, which is utilized to decode the bar code. The method includes scanning a bar code with a light beam whose diameter is small enough to detect thin bars and determining whether the bar code is a thin bar code or a thick bar code. If the bar code is the thick bar code, the reader employs data based upon analog electrical signals, whose frequency components higher than a first cut-off frequency determined for the thick bar code are cut off, as effective data. If the bar code is the thin bar code, the reader employs data based on analog electrical signals, whose frequency components higher than a second cut-off frequency determined for the thin bar code are cut off, as effective data.

7 Claims, 8 Drawing Sheets

FIG. 10a  BAR CODE

FIG. 10b  BINARY SIGNAL

FIG. 10c  DIFFERENTIATION SIGNAL

FIG. 10d  SCAN START PULSE

FIG. 10e  RESET SIGNAL

FIG. 10f  DATA SELECTING OPERATION

FIG. 12

BAR CODE READER SIGNAL PROCESSING METHOD AND DEVICE

BACKGROUND OF THE INVENTION

1. Field of the Invention

This invention relates to a signal processing method in a bar code reader, and a signal processing device for practicing the method.

2. Prior Art

In a bar code reader, a laser beam is applied to a bar code label, and scattering light beams reflected therefrom are converted into electrical signals by a light receiving unit, and the electrical signals are processed by a microcomputer to decode bar codes.

Bar codes employ thick bars of 1 mm in width, and thin bars of 0.2 mm in width. A bar code reader capable of reading both bar codes consisting of thick bars (hereinafter referred to as "thick bar codes") and bar codes consisting of thin bars (hereinafter referred to as "thin bar codes") has not yet been realized. Therefore, it is necessary to provide a bar code reader capable of reading thick bar codes, and a bar code reader capable of reading thin bar codes. More specifically, in the case where articles having bar code labels of thin bars, and articles having bar code labels of thick bars are mixed when conveyed, it is necessary to provide the above-described two separate kinds of bar code readers. The result of using both readers increases the equipment cost and the installation space is increased as much.

The reason why both of the thick bar codes and thin bar codes cannot be read with one kind of bar code reader is as follows:

The thick bar code reader uses a laser beam large in diameter. If the laser beam is applied to thin bar codes, then it will cover more than one thin bar. As a result, the output analog electrical signal of the light receiving unit is considerably low in sensitivity, and accordingly it is impossible to read the bar code.

On the other hand, in the case where a thin bar code reader is used to read thick bar codes, the above-described difficulty will not occur. However, since the laser beam diameter is smaller than the bar width, the sensitivity is so high that noise is picked up. More specifically, if a white bar of the bar code label is stained with ink or the like, then it is read as a black bar because the laser beam diameter is small. In addition, if a black bar of the bar code label is not well printed, then it will read as a white bar, so that the detection signal is outputted in the same manner as in the case of reading a white bar. In this case, the analog electrical signal outputted by the light receiving unit is made so irregular that it is difficult to read the bar code correctly.

On the other hand, a stationary type bar code reader is usually installed, for instance, on an assembling line in a factory, or a distribution line for transportation. The bar code reader operates to read the bar codes of labels bonded to articles being moved on by a conveyer.

However, the conventional bar code reader described above suffers from the further following difficulty: In order to allow the bar code reader to read bar codes even when the line speed is high, a method of bonding bar code labels to articles, and the size of them are limited.

More specifically, a bar code label must be bonded to an article in such a manner that the bar code is in parallel with the direction of scan of the laser beam with a tolerance of ±5°. If the angle between the bar code and the direction of scan is large, then an effective reading region in the direction of the bars of a bar code (where all the bars can be scanned with the laser beam) is decreased. Even when the first part of the bar code thus inclined is scanned, the data read (which is ineffective because all the bars are not scanned) is processed; that is, it takes time to process the ineffective data (decoding loss time). Therefore, when it attempts to read the bar code again, often the bar code has passed away, with the result that the bar code cannot be read. Thus, it is essential that the inclination of the label is within the tolerance.

A bar code is provided with numerals and characters defined by JIS X9001 (which can be read directly by a person). In the case where an article with a bar code label is moved on the line in such a manner that the numerals and characters are ahead of the bar code in the direction of movement of the line, the data is processed with the numerals and characters read, and therefore similarly as in the above-described case, a decoding loss time occurs. Because of the decoding loss time, it is impossible to scan the bar code again. In addition, the bar code region which is effective in scanning the bar code is decreased, so that the read percentage is decreased. In order to eliminate the difficulty, the bar code label should be bonded to the article so that the numerals and characters are located behind the bar code in the direction of movement.

A method of eliminating the above-described difficulty is to increase the length of a bar code in the direction of movement of the label. However, the method is disadvantageous in that the label is increased in manufacturing cost as much, and depending on articles, it is impossible to stick such a long label on them.

SUMMARY OF THE INVENTION

Accordingly, an object of this invention is to eliminate the above-described difficulty accompanying a conventional bar code reader.

Another object of the invention is to provide a bar code reader which can read both thin bar codes and thick bar codes.

A further object of the invention is to provide a bar code reader which can read bar codes even if the bar code label is set to be inclined with respect to the scanning direction.

The foregoing problems have been solved by the invention in which the cut-off frequency of an analog electrical signal is switched over to two difference values provided respectively for thin bar codes and thick bar codes, and it is determined whether the bar code read is a thin bar code or a thick bar code, so that only the data processed suitably according to the kinds of bar codes are employed.

More specifically, in a signal processing method in a bar code reader, according to the invention, a bar code is scanned with a light beam whose diameter is small enough to detect thin bars. It is first determined whether the bar code is a thin bar code or a thick bar code. If the bar code is a thick bar code, data based on analog electrical signals, whose frequency components are higher than a first cut-off frequency determined for the thick bar code are cut off, are employed as effective data. If the bar code is a thin bar code, data based on analog electrical signals, whose frequency components are higher than a second cut-off frequency determined for the thin bar code are cut off, are employed as effective data.

Further, the above-described difficulties have been eliminated by the present invention in which data provided by scanning a bar code is selected according to the number of times of switching the two states of a binary signal obtained by reading the bar code, so that only the data provided by scanning a bar code completely is employed as effective data.

DETAILED DESCRIPTION OF THE PREFERRED EMBODIMENTS

Referring to the attached drawings, embodiments according to the present invention will be described.

Figure 7:
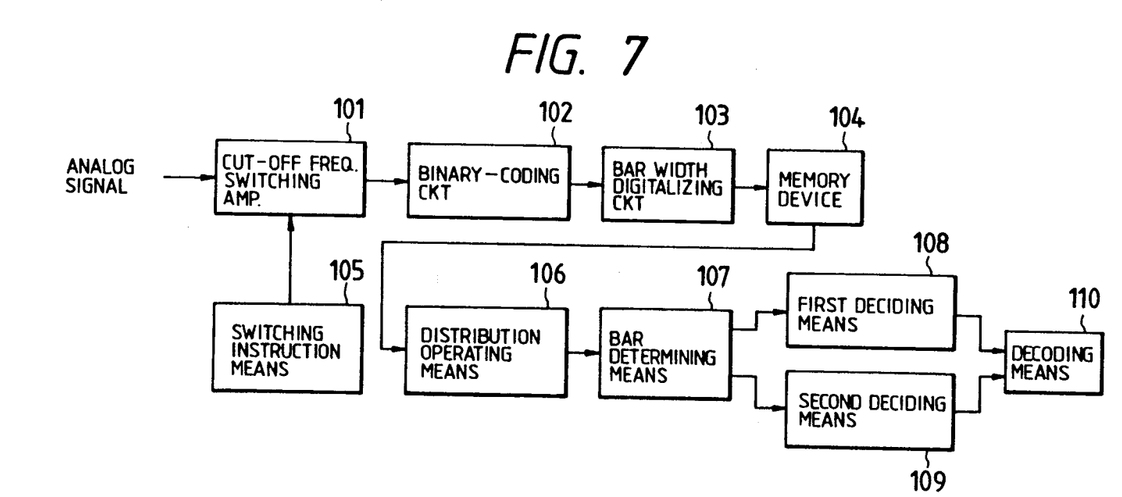
FIG. 7 is a block diagram showing the relationships between the circuit elements in a signal processing apparatus according to the invention.

First, a signal processing device in a bar code reader according to the present invention, as shown in FIG. 7, includes a cut-off frequency switching amplifier 101 which cuts off the frequency components of an analog electrical signal which are higher than a predetermined frequency and is switched with predetermined timing. The reader also includes a binary-coding circuit 102 for binary-coding an analog electrical signal provided by the cut-off frequency switching amplifier 101, a bar width digitalizing circuit 103 for utilizing a binary signal to operate bar width, and a memory device 104 for storing output data of the bar width digitalizing circuit 103. Switching instructing means 105 switches the cut-off frequency of the cut-off frequency switching amplifier 101 over to a first cut-off frequency or a second cut-off frequency higher than the first cut-off frequency alternately every predetermined number of scanning operations. Distribution operating means 106 operates the distribution of data bar width provided by each scanning operation and stored in the memory device 104, and bar determining means 107 uses the bar width distribution provided by the distribution operating means 106, to determine whether the bar code is a thick bar code or a thin bar code. First deciding means 108 is used when the bar determining means 107 determines that the bar code is a thick bar code, whether the determined data is obtained from the analog electrical signals whose frequency components higher than the first cut-off signal are cut off, or from the analog electrical signals whose frequency components higher than the second cut-off signal are cut off. This enables the data obtained from the analog electrical signals whose frequency components higher than the first cut-off frequency to be employed as effective data, while the data obtained from the analog electrical signals whose frequency components higher than the second cut-off frequency are canceled. Second deciding means 109 is used when the bar determining means determines that the bar code is a thin bar code, whether the data determined are obtained from the analog electrical signals whose frequency components higher than the first cut-off frequency are cut off, or from the analog electrical signals whose frequency components higher than the second cut-off signal are cut off. This allows the data obtained from the analog electrical signal whose frequency components higher than the second cut-off frequency are cut off to be employed as effective data, while the data obtained from the analog electrical signals whose frequency components higher than the first cut-off frequency are cut off are canceled. Encoding means 110 encodes the data employed by the first or second deciding means 108 and 109 into predetermined codes.

According to the present invention, the first cut-off frequency is suitable for thick bars, and is relatively low so that the signals having frequencies higher than the frequency corresponding to the thick bar are cut off. The second cut-off frequency is suitable for thin bars, and is higher than the frequency corresponding to the thin bar.

Therefore, in the case where the first cut-off frequency is employed, the output is as follows: in the case where the bar code read is a thick bar code, the output is normal; and in the case where the bar code read is a thin bar code, the signal is cut off in its entirety; that is, no output is provided.

On the other hand, in the case where the second cut-off frequency is employed, the output is as follows: in the case where the bar code read is a thin bar code, the output is normal; and in the case where the bar code read is a thick bar code, the output signal includes noises. Hence, if the output is determined by either obtaining the analog electrical signal by scanning a thick bar code, or by scanning a thin bar code, then normal outputs are obtained separately according to the thick bar and thin bar.

That is, when it is determined that the bar code read is a thick bar code, the data processed with the first cut-off frequency can be employed as effective data and when it is determined that the bar code read is a thin bar code, the data processed with the second cut-off frequency can be employed as effective data.

It can be determined from the distribution of bar width whether the bar code scanned is a thick bar code or a thin bar code. The bars are classified into wide bars and narrow bars. As is apparent from the distribution of bar width which is obtained through the bar code scanning operation, the bars are distributed showing two groups of bars, wide bars and narrow bars. Sometimes the detection signal of a bar code may include noise. However, since the noise is not distributed over a wide range, it can be determined from the distribution of bar width whether the analog electrical signal is obtained by scanning a thick bar code or by scanning a thin bar code. Hence, only normal data can be extracted as effective data. Thus, one bar code reader can read both of the thin bar codes and thick bar codes.

Figure 1:
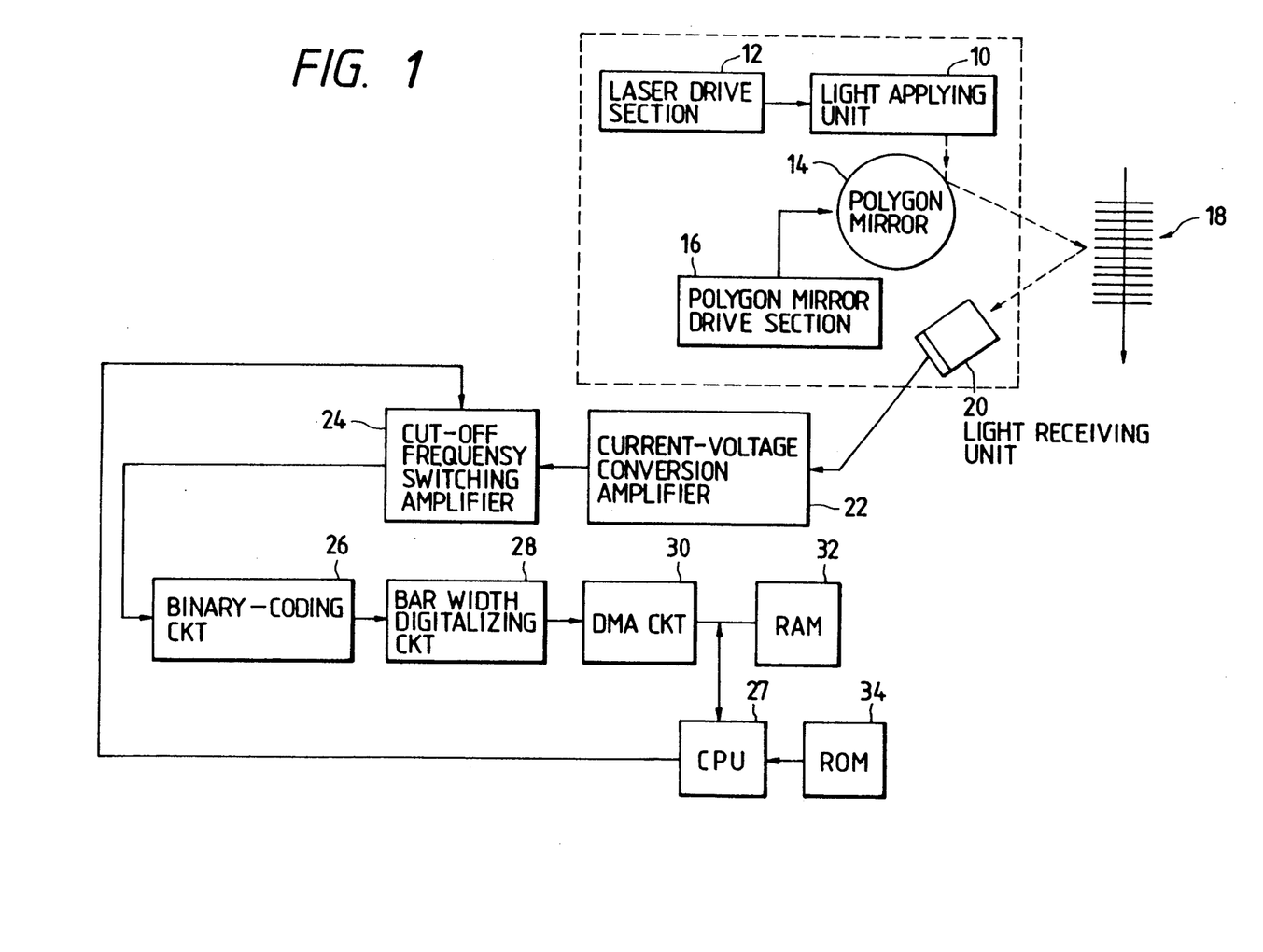
FIG. 1 is a block diagram showing one embodiment of this invention.

FIG. 1 is a block diagram showing an optical system and a signal processing section in a bar code reader. A light applying unit 10 applies a laser beam to a polygon mirror 14 in response to an instruction signal from a laser drive section 12. The laser beam is relatively small in diameter so as to be able to detect thin bars. The polygon mirror 14 is rotated by a polygon mirror drive section 16. A bar code 18 printed on a bar code label is scanned with the laser beam. The laser beam reflected from the bar code 18 is received by a light receiving unit 20 comprising a photo-diode, where it is converted into an electrical signal. The analog current signal of the light receiving unit 20 is applied to a current- voltage conversion amplifier 22, where it is converted into an analog voltage signal, which is applied to a cut-off frequency switching amplifier 24.

The cut-off frequency switching amplifier 24 operates to cut off the high frequency components of the input analog voltage signal which are higher than a predetermined cut-off frequency. The cut-off frequency of the amplifier 24 can be changed by an instruction from a CPU (central processing unit) 27. The signal processed by the cut-off frequency switching amplifier 24 is applied to a binary-coding circuit 26, the output of which is applied to a bar width digitalizing circuit 28, where it is converted into a numerical value representing the bar width. The output signal of the bar width digitalizing circuit 28 may be stored in a RAM 32 with the aid of a DMA circuit 30. The CPU 27 can make access to the RAM 32 and a ROM 34.

The apparatus shown in FIG. 1 operates as follows: First, the bar code 18 is scanned with the laser beam. More specifically, the laser beam is applied to the bar code 18 with the aid of the polygon mirror 14. Each bar code (18) is scanned with the laser beam thirty (30) times. The analog current signal provided by the light receiving unit 20 is applied to the current-voltage conversion amplifier 22, where it is converted into an analog voltage. The analog voltage is applied through the cut-off frequency switching amplifier 24 to the binary-coding circuit 26 and the bar width digitalizing circuit 28, so that it is converted into a numerical value representing the bar width, which is stored in the RAM 32.

Figure 2:
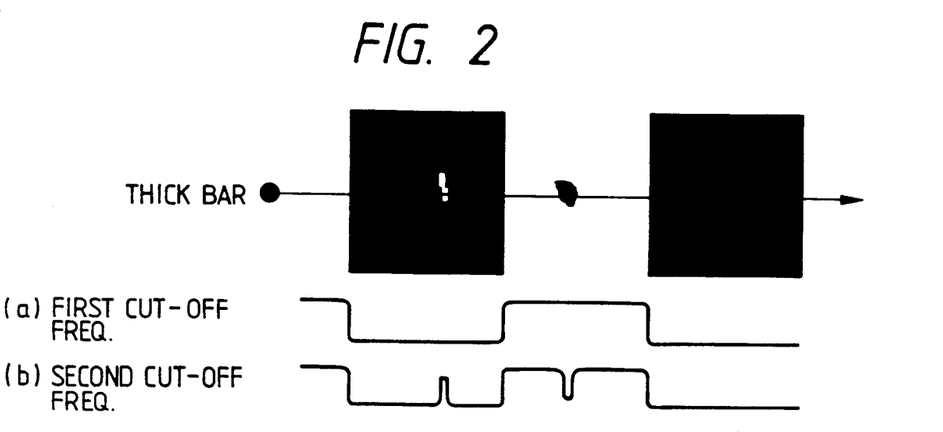
FIG. 2 is an explanatory diagram showing analog signals (a) and (b) provided in the case of a thick bar code.

When the analog voltage is applied to the cut-off frequency switching amplifier 24, its predetermined high frequency components are cut off. The cut-off frequency is changed every scan of the bare code; that is, a first cut off frequency and a second cut-off frequency are alternately switched therebetween every scanning operation. More specifically, for fifteen (15) scanning operations, the first cut-off frequency is employed; and for the remaining fifteen (15) scanning operation, the second cut-off frequency is employed. The first cut-off frequency is relatively low so as to be suitable for thick bars, while the second cut-off frequency is relatively high so as to be suitable for thin bars. Therefore, in the case where the bar code 18 is a thick bar code, the analog signal (a) processed with the first cut-off signal is normal as shown in FIG. 2, and the analog signal (b) processed with the second cut-off frequency is not normal as also shown in FIG. 2. In the latter case, the print defect of a bar, and a stain on the label are detected, and the resultant signal include noise.

Figure 3:
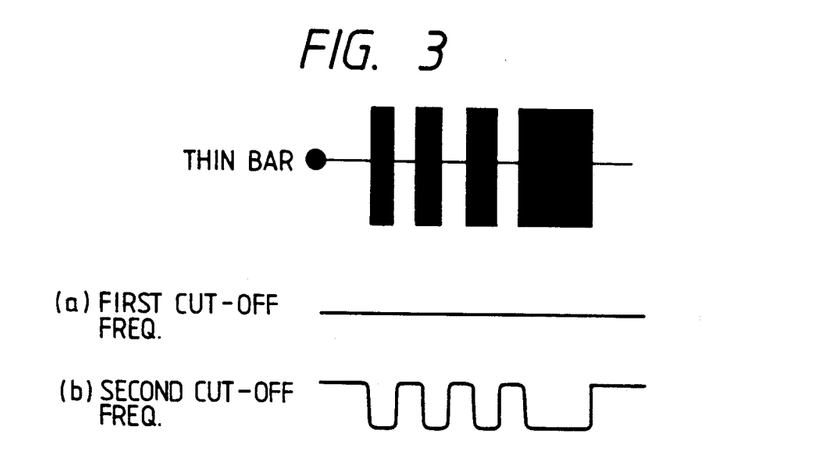
FIG. 3 is an explanatory diagrams showing analog signals (a) and (b) provided in the case of a thin bar code.

In the case where, on the other hand, a bar code 18 is a thin bar code, the output is as follows. When the first cut-off frequency is used, the frequencies of the signals obtained from the bars are in the cut-off region, as a result of which the output is signal (a) as shown in FIG. 3; that is, no output is provided. When the second cut-off frequency is used, the output (b) is normal as shown in FIG. 3.

The data stored in the RAM 32 by the thirty scanning operations are processed by the CPU 27. The process will be described referring to the flow chart shown in FIG. 6.

Figure 4:
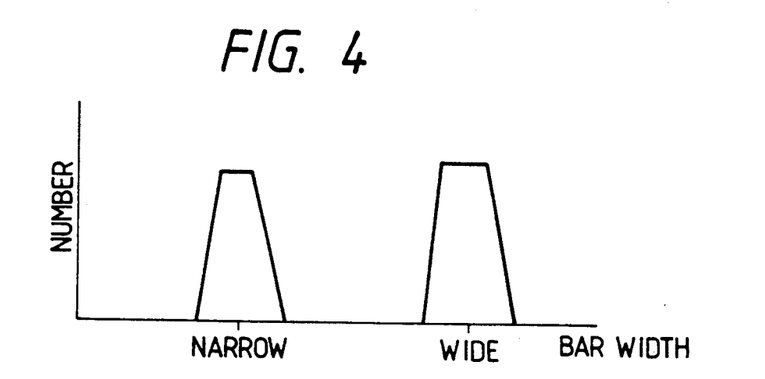
FIG. 4 is a diagram showing the distribution of bar width in the case where the output signal is normal.
Figure 5:
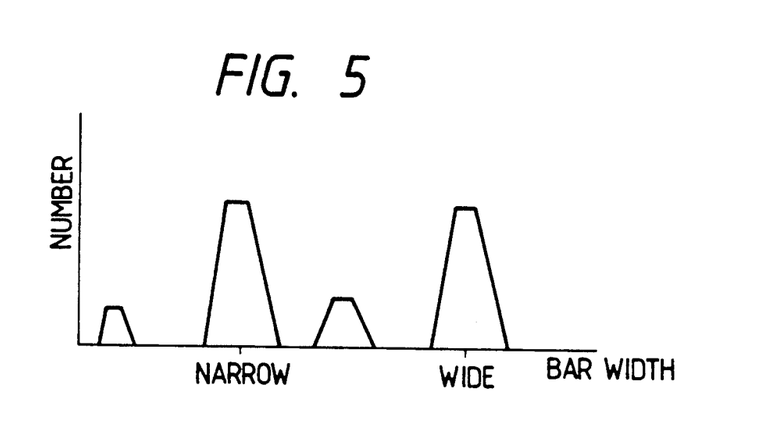
FIG. 5 is a diagram showing the distribution of bar width in the case where the output signal includes noises.

First, the distribution of bar width of the data provided by the first scanning operation is obtained (Step a). There are two kinds of bars, narrow bars and wide bars. Therefore, in the case where the output signal is normal as shown in FIG. 2 or in FIG. 3, the distribution of bar width is as shown in FIG. 4; that is, the data concentrate at two points, a narrow bar point and a wide bar point. Thus, it can be determined whether the data is of the narrow bar or of the wide bar (Step b). In the case of signal (b) in FIG. 2, because of the noise, the data also appear at points other than the narrow bar point and the wide bar point as shown in FIG. 5; however, the amount of data at the narrow bar point and the wide bar point are much larger than the amount of data at the other points, and therefore it can be determined whether the bar read is a thick bar or a thin bar. In the case of signal (a) in FIG. 3, since no output signal is provided, the process of determining from the distribution whether the bar read is a thick bar or a thin bar is no use in practice.

Figure 6:
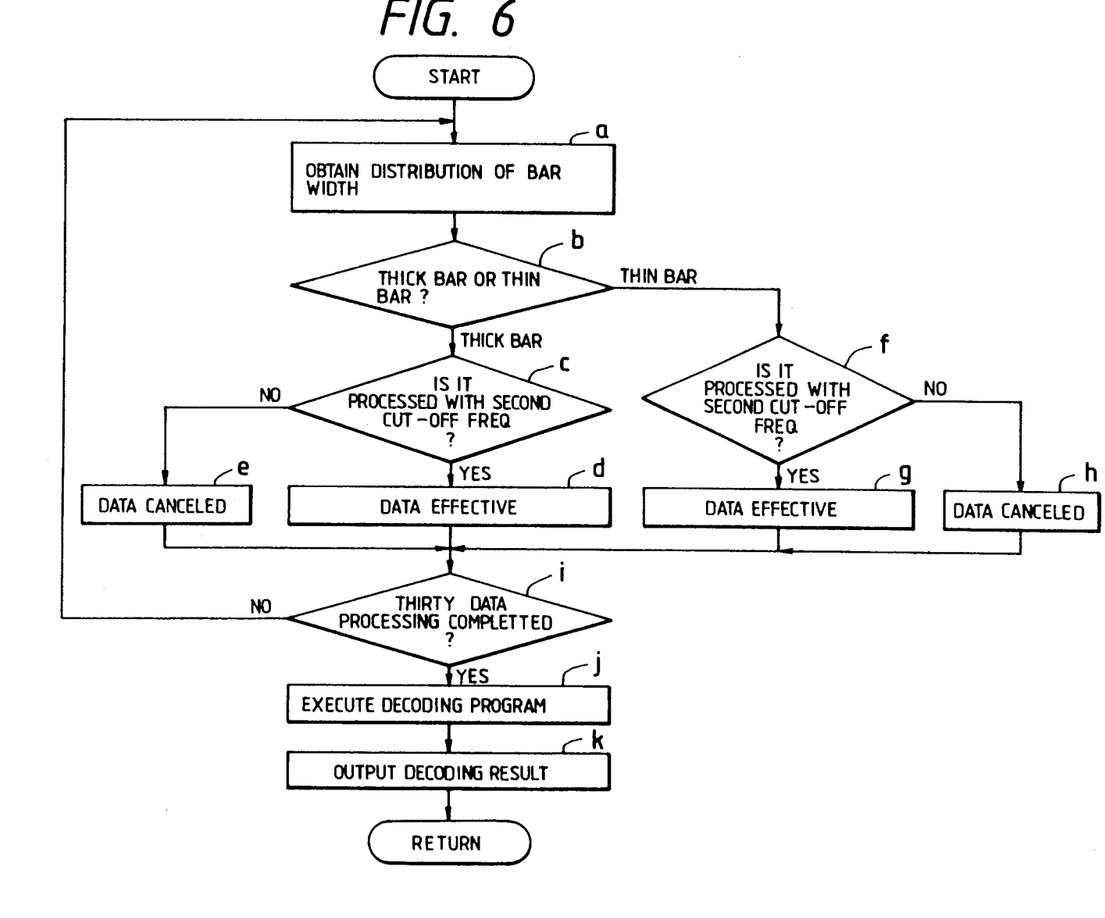
FIG. 6 is a flow chart for a description of the control operation of the embodiment.

In the case where it is determined in the above-described manner that the bar read is a thick bar (Step c), the following operation is carried out: if the data of this time is processed with the first cut-off frequency, it is employed as effective data (Step d); and if it is processed with the second cut-off frequency, it is canceled (Step e). On the other hand, in the case where it is determined that the bar read is a thin bar, the following operation is carried out: That is, if the data is processed with the second cut-off frequency (Step f), it is employed as effective data (Step g); an if it is processed with the first cut-off frequency, it is canceled (Step h). The data provided by the thirty scanning operations are processed as described above (Step i), and the resultant data of fifteen scanning operations are used to execute the decoding program (Step j), and the results of the decoding operation are converted into predetermined codes, which are outputted (Step k).

As is apparent from the above description, in the case where the bar code 18 is a thick bar code, it is decoded by using only the data processed with the first cut-off frequency provided for thick bar; and in the case where the bard code 18 is a thin bar code, it is decoded by using only the data processed with the second cut-off frequency provided for thin bar. Thus, the bar code can be read whether it is a thin bar code or a thick bar code.

In the above-described embodiment, the switching of the cut-off frequencies is carried out every scanning operation. However, it may be carried out every plural scanning operations, or it may be performed so that the first cut-off frequency is used for the first half of scanning operations, and the second cut-off frequency is used for the second half, and vice versa.

In the above-described embodiment, the number of scanning operation is thirty (30); however, it goes without saying that the invention is not limited thereto or thereby. In addition, it is not always necessary that the number of processing operations with the first cut-off frequency is equal to that of processing operation of the second cut-off frequency. Furthermore, it is not always required to use all of the data provided, for instance, by fifteen (15) scanning operations. That is, the circuit may be so modified that, when the results of decoding the first two of the data coincide with each other, the results are outputted, or it may be so modified that the first of the data is used. Therefore, even when the bar code has passed before all of the thirty scanning operations are accomplished (with the result that the data are provided by only ten (10) scanning operations), the bar code can be positively read.

Figure 8:
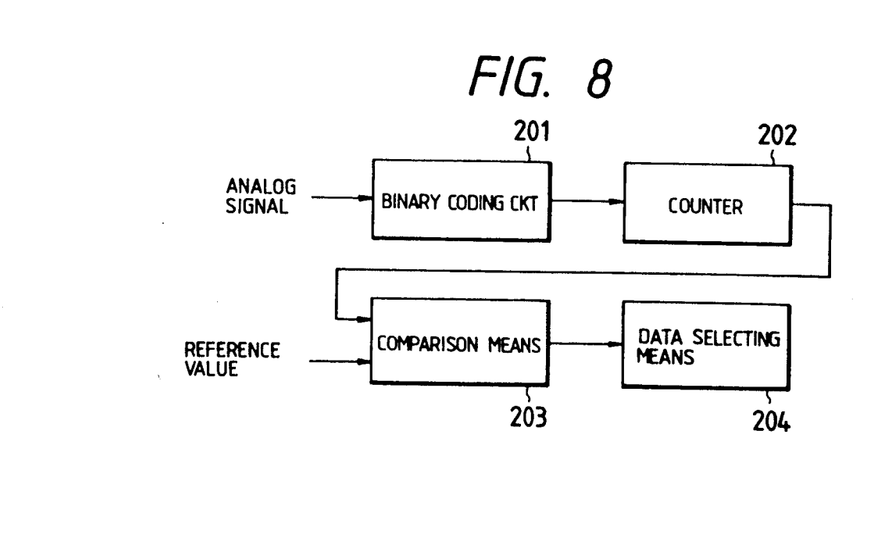
FIG. 8 is a block diagram showing relationships between circuit elements of a signal processing device according to the invention.

Further, a signal processing device according to the present invention, as shown in FIG. 8, is basically constructed by a binary coding circuit 201 for converting an analog electrical signal into a binary signal, a counter 202 for counting the number of times of switching the two states of the binary signal and comparison means 203 for comparing a count value provided by the counter 202 with a predetermined reference value. Data selecting means 204 are also included which, when the count value is smaller than the reference value, makes data obtained by scanning the bar code ineffective, and when it is equal to or larger than the reference value, employs data obtained by scanning the bar code as effective data.

When a bar code is inclined with respect to the direction in which the laser beam scans, at the initial scanning stage only a part of each bar is scanned, and accordingly the number of times the reader switches between the two states of the binary signal is smaller than that provided when all the bars are scanned. That is, in this case, the number of switches between the two states is smaller than the reference value, and the data read is canceled. Soon all the bars will be scanned by the laser beam. In this case, the number of times the reader switches between the two states will reach the reference value, and the data read is employed as effective data.

Thus, in a very short time, only the effective data are obtained. This will allow a bar code to be smaller in length, and relieve the limitation both in the direction in which a bar code label is stuck on an article, and in the inclination of a bar code label with respect to the direction of scan. The data employed as effective data is stored for instance in a memory means, and is decoded.

Accordingly, the bar code decoding operation is not carried out until the effective data is inputted, with the result that the decoding loss time will never occur, and the bar code is correctly read at all times.

Figure 9:
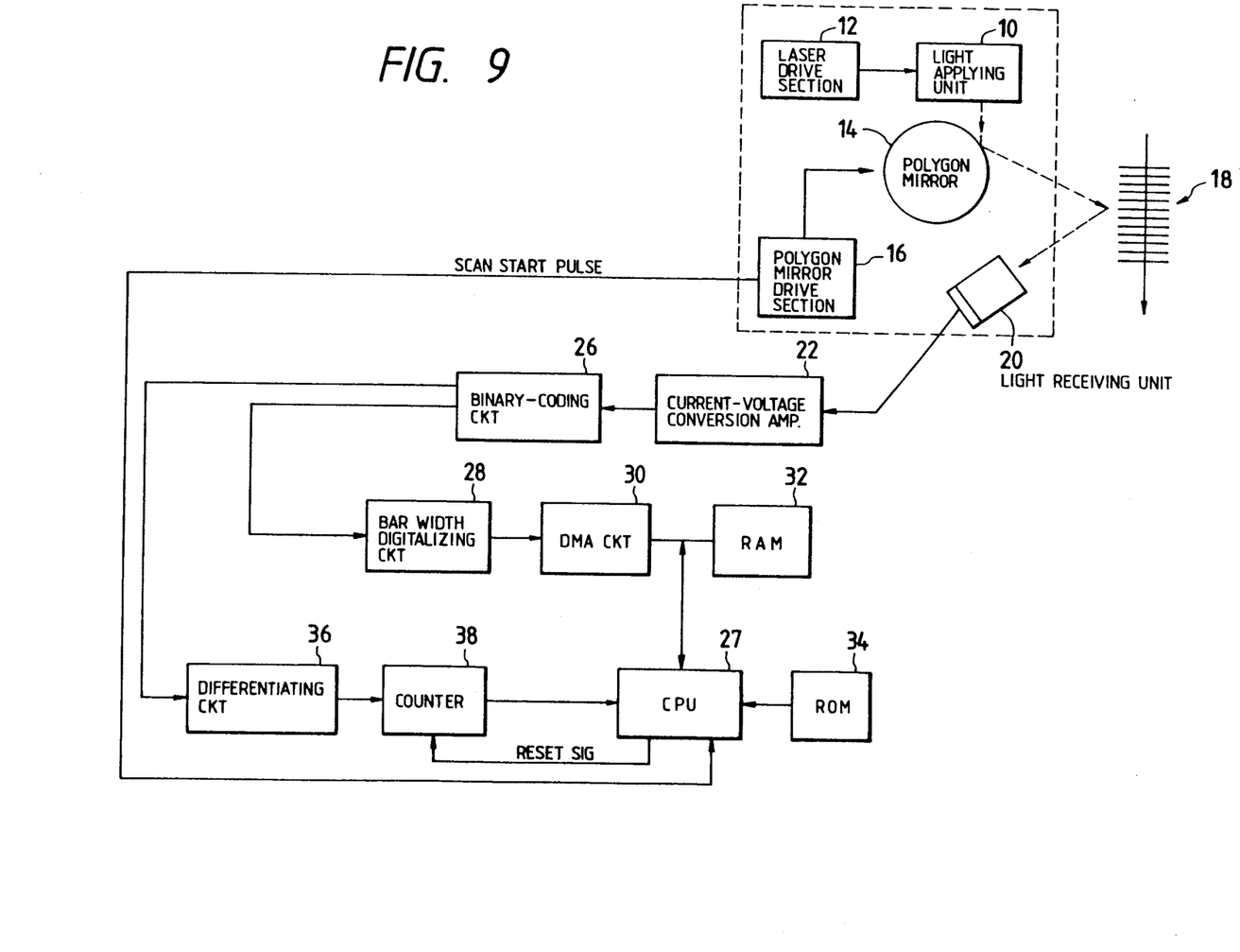
FIG. 9 is a block diagram showing another embodiment of the invention.

FIG. 9 is a block diagram showing another embodiment of the present invention. A light applying unit 10 operates to apply a laser beam to a polygon mirror 14 in response to an instruction signal from a laser drive section 12. The laser beam is reflected by the polygon mirror 14. The polygon mirror 14 is rotated by a polygon mirror drive section 16 so that the laser beam reflected therefrom scans a bar code 18 on a label which has been stuck on an article placed on a conveyor. The light beam reflected from the bar code 18 is received by a light receiving unit 20, where it is converted into analog current signal.

The output of the light receiving unit 20; i.e., the analog current signal is applied to a current-voltage conversion amplifier 22, where it is converted into an analog voltage signal. The analog voltage signal is converted into a binary signal by a binary coding circuit 26. The binary signal is converted into a numerical value representing a bar width by a bar width digitalizing circuit 28. The data from the circuit 28 is stored in a RAM 32 with the aid of a DMA circuit 30. The binary signal provided by the binary coding circuit 26 is further applied to a differentiating circuit 36, which outputs a differentiation signal indicating the switching of two states of the binary signal. The differentiation signal is counted by a counter 38. The result of count is applied to a CPU 27, which is connected to a ROM 34 storing a predetermined program.

The operation of the above-describe embodiment will be described. When the bar code label stuck on an article is moved to a predetermined position by the conveyor, the bar code is scanned with the laser beam. The light beam reflected from the bar code 18 is received by the light receiving unit 20, which outputs an analog current signal. The analog current signal is applied to the current-voltage conversion amplifier 22, where it is converted into an analog voltage signal. The analog voltage signal is converted into a binary signal by the binary coding circuit 26.

Figure 10A:
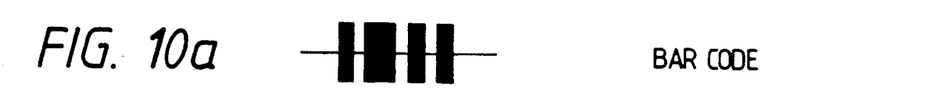
FIGS. 10a to 10f are a time chart showing the timing of various signals in the embodiment.
Figure 10B:
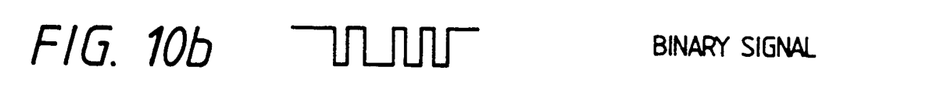
Figure 10C:
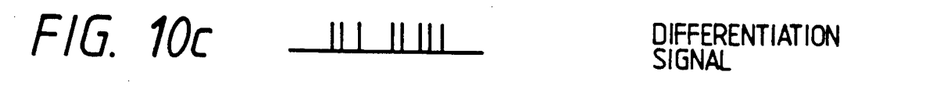
Figure 10D:
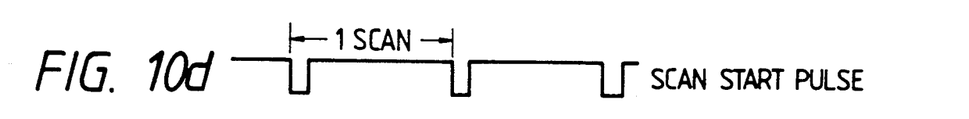
Figure 10E:
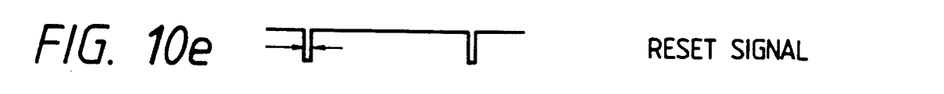
Figure 10F:
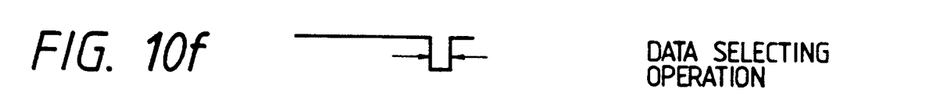

When a bar code 18 as shown in FIG. 10a is scanned with the laser beam, the resultant binary signal is as shown in FIG. 10b. The binary signal is differentiated by the differentiating circuit 36, thus providing a differentiation signal as shown in FIG. 10c. The differentiation signal indicates the number of times the device switches between the two states of the binary signal, which are counted by the counter 38. The result of count is applied to the CPU 27. The counter 38 is reset by a reset signal, as shown in FIG. 10e, which the CPU 27 outputs upon reception of a scan start signal, as shown in FIG. 10d, representing the start of one scanning operation. During the period of time which elapses from the time instant that the differentiation signal is output until the next scanning operation is carried out, a data selecting operation as shown in FIG. 10f is performed by the CPU (as described later).

Figure 11:
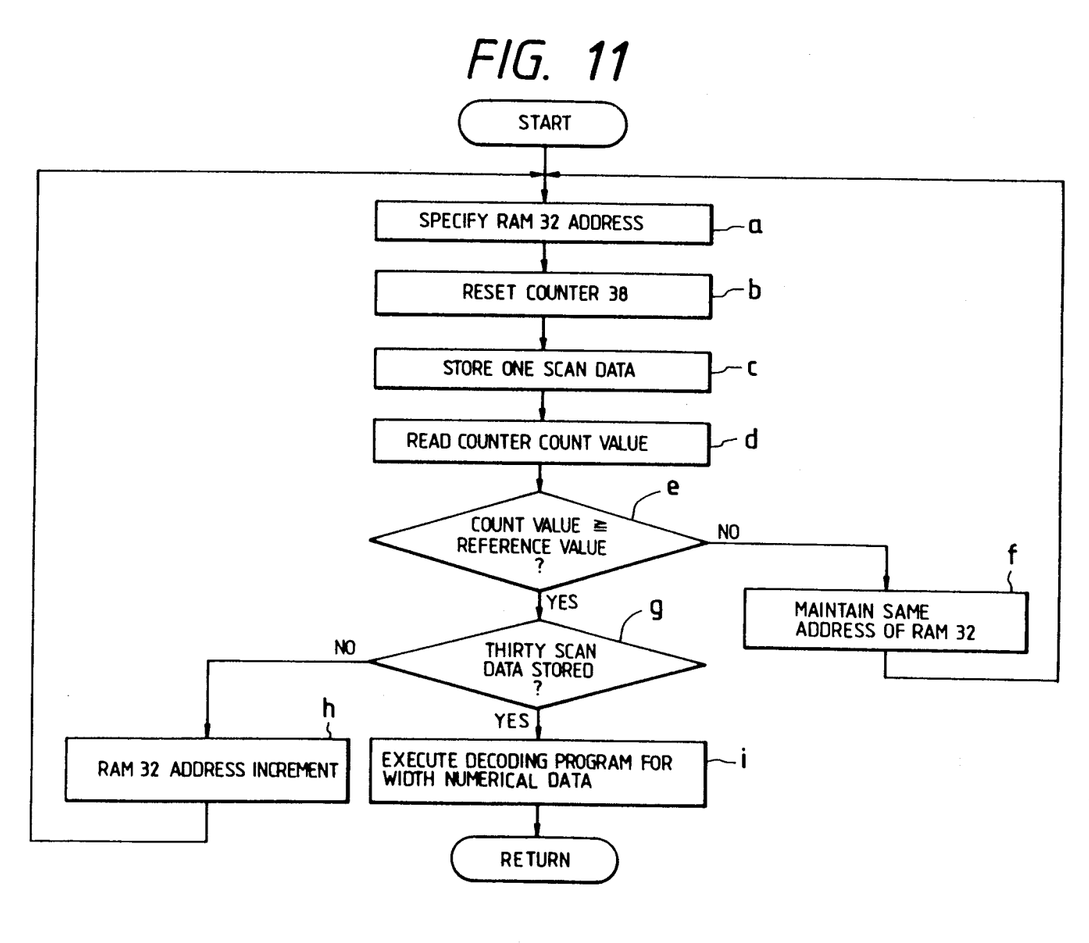
FIG. 11 is a flow chart for a description of the operation of the embodiment.

The CPU 27 performs the following control: first, the CPU specifies an address in the RAM 32 which stores bar width numerical data with the aid of the DMA circuit 30 (Step a in FIG. 11). Then, upon reception of the scan start signal, the CPU outputs the reset signal to reset the counter 38 (Step b). Under this condition, the CPU controls the DMA circuit for one scanning operation so that the bar width numerical data for that scanning operation is stored in a predetermined address in the RAM 32 (Step c). The CPU reads the count value of the counter 38 (Step d), and compares it with a reference value (Step e).

The reference value has been predetermined according to the bar code standard and the number of digits to be used. For instance, in the case of the ITF standard, for each start and stop the two-state switching operation occurs four times, and for each digit the two-state switching operation occurs five times, and therefore for N digits $(8+5\times N)$ reference values are selected. In the case where the count value is smaller than the reference value, with the same address maintained (Step f) the operations from Step a down are repeatedly carried out. In the case where the count value reaches the reference value, it is determined whether or not the data for instance for thirty scanning operations have been stored in the RAM 32 (Step g). If not, an increment of the address is performed (Step h), and the operation from Step a is effected again. When the data for the thirty scanning operations have been stored, a program for decoding the bar width numerical data stored in the RAM 32 is executed (Step i).

Figure 12:
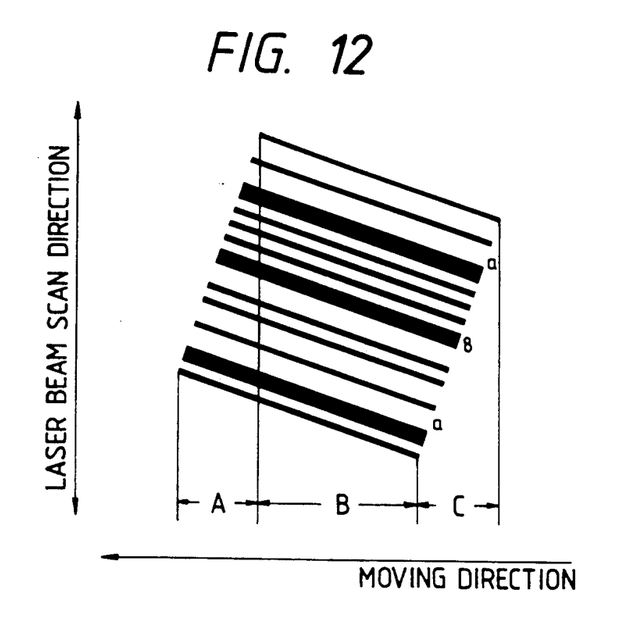
FIG. 12 is an explanatory diagram showing a bar code inclined with respect to the direction of scan.

The above-described controls result in the following actions. Let us consider the case where the bar code is conveyed at an angle to the direction in which the laser beam scans, as shown in FIG. 12. For the region A, decoding the bar width numerical data is not carried out, because the count value of the counter 38 is smaller than the reference value, and the increment of the address is not carried out, and accordingly the bar width numeral data decoding program is not executed. When the region B is scanned, the count value reaches the reference value, and the bar width numerical data for thirty scanning operations are stored, and accordingly the bar width numerical data decoding program is executed. Thus, even in the case where the bar code 18 is inclined as shown in FIG. 12, the region B is scanned, so that the bar code is decoded.

In the prior art, for the region A the bar width numerical data decoding program is executed, and during the execution of the program the bar code label is passed through the scanning position, or the region C comes to the scanning position before the region B is scanned a predetermined number of times, as a result of which it is impossible to read the bar code.

On the other hand, in the invention, as was described above the decoding operation is started when the region B is at the scanning position, and therefore the bar code is positively read. Furthermore when the numerals and characters added to the bar code are scanned earlier than the bar code, the bar width numerical data decoding program is not executed until the region B comes to the scanning position. Therefore, the bar code label can be set in any direction.

As was described above, with the bar code reader according to the invention, it is determined whether the bar code read is a thick bar code or a thin bar code, and, depending on the bar code thus determined, the data processed with the cut-off frequency provided therefor are used. Therefore, the bar code reader of the invention can read both of the thin bar codes and thick bar codes. That is, one bar code reader can read both thin bar codes and thick bar codes, according to the invention.

Further, as was described above, in the invention, the number of times of switching the two states of the binary signal is counted, and the data provided when the count value reaches the reference value is employed as effective data. Therefore, it is unnecessary to increase the size of the bar code label, and the tolerance in inclination of the label is increased. In addition, a bar code can be positively read irrespective of the direction of the bar code label.

What is claimed is:

1. A method of processing a signal in a bar code reader in which an optical signal provided by scanning a bar code is subjected to photo-electric conversion to provide an analog electrical signal, which is utilized to decode said bar code, said method comprising the steps of:

scanning a bar code with a light beam whose diameter is small enough to detect thin bars;
determining whether said bar code is a thin bar code or a thick bar code;
if said bar code is said thick bar code. then employing data based on analog electrical signals, whose frequency components higher than a first cut-off frequency corresponding to said thick bar code are cut off, as effective data; and
if said bar code is said thin bar code, then employing data based on analog electrical signals, whose frequency components higher than a second cut-off frequency corresponding to said thin bar code are cut off, as effective data.

2. A method of processing a signal in a bar code reader in which an optical signal provided by scanning a bar code is subjected to photo-electric conversion to provide an analog electrical signal, which is utilized to decode said bar code, said method comprising the steps of:

scanning a bar code a plurality of times with a light beam whose diameter is small enough to detect a thin bar, to provide analog electrical signals,
processing said analog electrical signals provided by a predetermined number of scanning operations by cutting off frequency components higher than a first cut-off frequency,
processing the remaining analog electrical signals by cutting off the frequency components higher than a second cut-off frequency which is higher than said first cut-off frequency;
obtaining bar width data from one of said analog electrical signals, whose frequency components higher than said first cut-off frequency are cut off, and said analog electrical signals, whose frequency components higher than said second cut-off frequency are cut off;
storing said data thus obtained for said plurality of scanning operations;
obtaining a distribution of bar widths for each scanning operation;
determining whether said bar code read is a thick bar code or a thin bar code from said distribution thus obtained;
if said bar code is said thick bar code, then employing said data obtained from said analog electrical signals, whose frequency components higher than said first cut-off frequency are cut off as, effective data, and canceling said data obtained from said analog electrical signals, whose frequency components higher than said second cut-off frequency are cut off;
if said bar bode is said thin bar code, then employing said data obtained from said analog electrical signals, whose frequency components higher than said first cut-off frequency are cut off, as effective data, and canceling said data obtained from said analog electrical signals, whose frequency components higher than said first cut-off frequency are cut off; and
decoding said data thus employed.

3. A device for processing a signal in a bar code reader in which an optical signal provided by scanning a bar code is subjected to photo-electric conversion to provide an analog electrical signal, which is utilized to decode said bar code, said device comprising:

a cut-off frequency switching amplifier for cutting off frequency components of said analog electrical signal which are higher than a predetermined cut-off frequency, said predetermined cut-off frequency being switched with predetermined timing;

binary-coding means for binary-coding said analog electrical signal from said cut-off frequency switching amplifier to provide a binary signal;

bar width digitalizing means for converting a bar width according to said binary signal into a corresponding numerical value;

memory means for storing output data of said bar width digitalizing means;

switching instructing means for switching said predetermined cut-off frequency of said cut-off frequency switching amplifier between a first cut-off frequency and a second cut-off frequency higher than said first cut-off frequency in a predetermined order;

distribution operating means for operating the bar width distribution of the data provided by each scanning operation and stored in said memory means;

bar determining means for determining whether said bar code is a thick bar code or a thin bar code according to said distribution of bar width provided by said distribution operating means;

first deciding means for, when said bar determining means determines that said bar code is said thick bar code, determining whether said data is obtained from said analog electrical signals, whose frequency components higher than said first cut-off signal are cut off, or from said analog electrical signals, whose frequency components higher than said second cut-off signal are cut off, to employ as effective data said data obtained from said analog electrical signals, whose frequency components higher than said first cut-off frequency are cut off, and to cancel said data obtained from said analog electrical signals, whose frequency components higher than said second cut-off frequency are cut off;

second deciding means for, when said bar determining means determines that said bar code is said thin bar code, determining whether said data are obtained from said analog electrical signals, whose frequency components higher than said first cut-off frequency are cut off, or from said analog electrical signals, whose frequency components higher than said second cut-off signal are cut off, to employ as effective data said data obtained from said analog electrical signal, whose frequency components higher than said second cut-off frequency are cut off, and to cancel said data obtained from said analog electrical signals, whose frequency components higher than said first cut-off frequency are cut off; and encoding means for encoding said data employed by one of said first and second deciding means into predetermined codes.

4. A device for processing a signal in a bar code reader in which an optical signal obtained by scanning a bar code is converted into an analog electrical signal, and said analog electrical signal is utilized to decode said bar code, said device comprising:

binary coding means for converting said analog electrical signal into a binary signal;

memory means for storing the binary signal representing numerical data from one scanning operation of said bar code;

a counter for counting the number of times said binary signal switches between two binary states to provide a count value;

comparison means for comparing said count value provided by said counter with a predetermined reference value; and data selecting means for determining when said count value is smaller than said predetermined reference value, thereafter making data obtained by said one scanning operation ineffective, and for determining when said count value is equal to or larger than said predetermined reference value, thereafter scanning said bar code as effective data.

5. A device as claimed in claim 4, wherein said memory means successively stores said effective data scanned by said data selecting means; and said device further comprises means for causing a data decoding program to be executed after storing data obtained by repeating said scanning operation a predetermined number of times.

6. A device as claimed in claim 4, further comprising means for setting, as said predetermined reference value, the number of times said binary signal must switch between two binary states to be selected as a correct bar code, according to a bar code standard and the number of digits of said bar code.

7. A device as claimed in claim 5, further comprising means for setting, as said predetermined reference value, the number of times said binary signal must switch between two binary states to be selected as a correct bar code, according to a bar code standard and the number of digits of said bar code.

* * * * *